(12) United States Patent
Yao et al.

(10) Patent No.: US 9,503,193 B2
(45) Date of Patent: Nov. 22, 2016

(54) METHOD AND SYSTEM FOR USING PERSISTENT IDENTIFIERS IN PASSIVE OPTICAL NETWORKING

(71) Applicants: Pook-Ping Yao, Coquitlam (CA); Byron Thom, Vancouver (CA); Daniel Ronald, Burnaby (CA)

(72) Inventors: Pook-Ping Yao, Coquitlam (CA); Byron Thom, Vancouver (CA); Daniel Ronald, Burnaby (CA)

( * ) Notice: Subject to any disclaimer, the term of this patent is extended or adjusted under 35 U.S.C. 154(b) by 13 days.

(21) Appl. No.: 14/542,635

(22) Filed: Nov. 16, 2014

(65) Prior Publication Data

US 2015/0139645 A1     May 21, 2015

Related U.S. Application Data

(60) Provisional application No. 61/905,467, filed on Nov. 18, 2013.

(51) Int. Cl.
*H04B 10/27*     (2013.01)
*H04L 12/26*     (2006.01)
*H04Q 11/00*     (2006.01)

(52) U.S. Cl.
CPC ............. *H04B 10/27* (2013.01); *H04L 43/00* (2013.01); *H04Q 11/0067* (2013.01)

(58) Field of Classification Search
CPC .................... H04B 10/27; H04Q 11/0067
USPC ........................................................ 398/58
See application file for complete search history.

(56) References Cited

U.S. PATENT DOCUMENTS

| | | | |
|---|---|---|---|
| 2009/0010650 A1* | 1/2009 | Tsuchiya | H04J 3/0602 398/59 |
| 2009/0049532 A1* | 2/2009 | Gao | H04L 63/08 726/5 |
| 2010/0196006 A1* | 8/2010 | Lin | H04L 12/287 398/58 |
| 2013/0142514 A1* | 6/2013 | Chen | H04B 10/27 398/66 |
| 2013/0236178 A1* | 9/2013 | Garavaglia | H04L 12/2801 398/67 |

* cited by examiner

*Primary Examiner* — David Payne
*Assistant Examiner* — Omar S Ismail

(57) ABSTRACT

A method of configuring an optical network terminal (ONT) at a computer terminal is described. The method may include reading in an instruction including a persistent identifier and an ONT command, identifying the ONT within a database using the persistent identifier, packaging an optical communication command to be sent through an optical line terminal (OLT) using the ONT identified by the persistent identifier through the database, and sending the optical communication command to the ONT through the OLT. The instruction may be operable to configure the ONT. Identifying the ONT may include referencing the persistent identifier against a table including standard transient ONT identifiers stored within the database. The OLT may be optically coupled to the ONT using a passive optical networking.

15 Claims, 3 Drawing Sheets

METHOD AND SYSTEM FOR USING PERSISTENT IDENTIFIERS IN PASSIVE OPTICAL NETWORKING

CROSS-REFERENCE TO RELATED APPLICATIONS

This application claims the benefit of U.S. Provisional Patent Application No. 61/905,467 filed Nov. 18, 2013.

FIELD OF THE INVENTION

This invention is related to optical networking and in particular, a management system for passive optical networking.

BACKGROUND OF THE INVENTION

Passive optical networking is well known in the art to provide telecom services, such as video, voice and data. However, the use and requirements of telecom providers are very different than those of the enterprise. While telecom providers must are closed networks with very specialized and highly trained network engineers, enterprise users may run the gamut from knowledgeable to novices.

A better paradigm for configuring and managing an enterprise network are desired.

SUMMARY OF THE INVENTION

The object of the invention is to provide an improved management layer for an enterprise network. In particular, the following system will provide a management layer that will empower a client to manage deployed devices in a simple-to-use manner.

In one aspect, the invention may reside in a system for implementing a persistent identifier for an optical network terminal (ONT). The system may include an optical line terminal (OLT) operable to register with the ONT; one or more processors in communication with the OLT; and a database coupled to the one or more processors. In operation, the OLT sends a registration event to the processor once the ONT is registered with the OLT, wherein the persistent identifier is used by a user to identify the ONT without referencing any information particular to the ONT or the OLT.

In another aspect, the invention may reside in a method for assigning a persistent identifier to an optical network terminal (ONT) by a processor. The method may include connecting the ONT to a network line terminal (OLT) over a fibre optic connection; registering the ONT with the OLT; and sending a registration event from the OLT to the processor. Processing the registration event at the processor may include creating a table entry within a database linking the registration event to a persistent identifier inputted by a user upon initial registration of the ONT by the processor. It may also include linking the persistent identifier, previously inputted by the user, with the registration event of the ONT upon subsequent registrations of the ONT by the processor.

In another aspect, the invention may reside in a method of configuring an optical network terminal (ONT) at a computer terminal. The method may include reading in an instruction including a user-inputted persistent identifier and an ONT command, identifying the ONT within a database using the persistent identifier, wherein identifying the ONT includes referencing the persistent identifier against a table including standard ONT identifiers stored within the database; packaging an optical communication command to be sent through an optical line terminal (OLT) using the ONT identified by the persistent identifier; and sending the optical communication command to the ONT through the OLT, which is optically coupled to the ONT. The instruction may be operable to configure the ONT.

In yet another aspect, the invention may reside in a method of communicating with an optical line terminal (OLT) by a system. The method may include receiving a registration event from the OLT, interpreting the registration event to determine if the ONT is already known to the system, and updating the system to acknowledge the registration of the ONT, if the ONT is recognized. The registration event may indicate the OLT has successfully registered an optical network terminal (ONT) with the OLT via an optical coupling. The method may also include configuring the ONT with information stored by the system and accepting a persistent identifier to abstract the ONT from the system for future configuration by a user, if the ONT is recognized.

In yet a further aspect, the invention may reside in a system for implementing a persistent identifier for an optical network terminal (ONT). The system may include an optical line terminal (OLT) operable to register with the ONT; one or more processors in communication with the OLT; and a database coupled to the one or more processors. The OLT may send a registration event to the processor once the ONT is registered with the OLT and the persistent identifier may be used by a user to identify the ONT without referencing any information particular to the ONT or the OLT.

Other devices, methods and machine-readable media are also described.

BRIEF DESCRIPTION OF THE DRAWINGS

The disclosure is described by way of example with reference to the following accompanying drawings, wherein.

DETAILED DESCRIPTION

Figure 1:
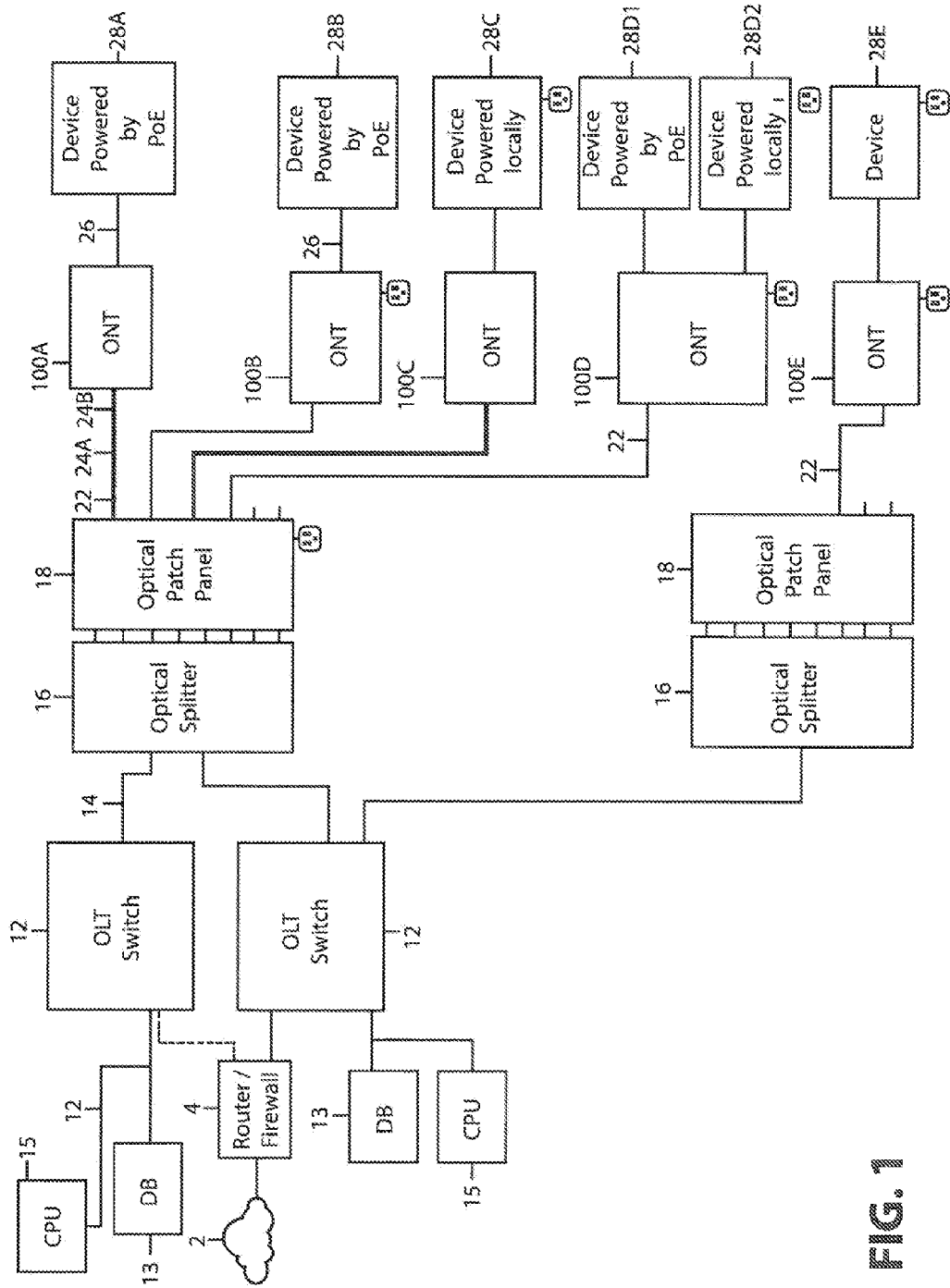
FIG. 1 shows a passive optical network in accordance with an embodiment of the present invention.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes such as an application specific integrated circuit (ASIC), or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing information in a form readable by a machine (e.g., a computer). For example, a machine-readable medium includes read only memory ("ROM"); random access memory ("RAM"); magnetic disk storage media; optical storage media; flash memory devices; etc.

At least certain embodiments of the present disclosure include one or application programming interfaces (API) or drivers in an environment with user interface software interacting with a software application. Various function calls or messages are transferred via the application programming interfaces between the user interface software and software applications. Transferring the function calls or messages may include issuing, initiating, invoking or receiving the function calls or messages. Example application programming interfaces transfer function calls to implement scrolling, gesturing, and animating operations for a device having a display region. An API may also implement functions having parameters, variables, or pointers. An API or driver may receive parameters as disclosed or other combinations of parameters. In addition to the APIs or drivers disclosed, other APIs or drivers individually or in combination can perform similar functionality as the disclosed APIs or drivers.

FIG. 1 illustrates a local area network 10 (LAN) using fiber optic connections in accordance with an embodiment of the present invention. The LAN 10 includes an optical line terminal 12 (OLT), optical splitter 16, and optical network terminal 100 (ONT) (shown in FIG. 1 as ONT 100A-100E). The OLT is coupled to the optical splitter 16 by a first fiber optic connection 14. Furthermore, the passive optical splitter is coupled with the ONT 100 using a second fiber optic connection 22.

The OLT 12 may be connected to one or more processors (illustrated as CPU 15) and a database (shown as DB 13). In some embodiments, the CPU 15 and DB 13 may be integrated with the OLT 12.

The LAN 10 may be connected to external networks 2, such as the internet. In some embodiments a router/firewall 4 may be used.

The ONT 100 is coupled with a peripheral device 28 (seen in FIG. 1 as peripheral devices 28A-28E). Peripheral devices 28A-28E may include any number of types of devices for inclusion within LAN 10. For example, a peripheral device 28 may include a computer, a printer, a server and the like. In a preferred embodiment, the peripheral device 28 may be a camera, such as a security camera, connected in a LAN 10 which is designed to provide security coverage of a building, area and the like.

In some embodiments, an Ethernet cable (not shown) of the peripheral device 28 may be used to couple the peripheral device 28 to the ONT 100 over an Ethernet standard. For example, if the peripheral device is network enabled, the ONT 100 may connect to the peripheral device through the peripheral device's network jack.

In other embodiments, the ONT may be incorporated directly into the peripheral device 28. For example, a network interface card (not shown) or proprietary connector and the like may be installed in the peripheral device 28 for coupling the ONT 100 to the peripheral device 28. For example, a small form-factor pluggable transceiver (SFP) may be used. In this manner, the ONT 100 may be installed directly in the peripheral device 28 and may be operable to communicate with the peripheral device 28 over a bus (not shown) or other communication channel, as known in the art.

The OLT 12 is in communication with the ONT 100 using a passive optical networking (PON) standard. As known in the art, a passive optical network (PON) is a point-to-multipoint network architecture which uses passive (i.e. unpowered) optical splitters to connect to peripheral devices 28 over optical fiber. In this manner, an OLT 12 is operable to enable a single optical fiber to/serve multiple peripheral devices 28. Typical PON implementations have between 16-128 peripheral devices 28. Architectures utilizing a PON reduce the amount of fiber and related infrastructure required to connect network in comparison to point-to-point architectures.

Any suitable version of a PON standard may be used. For example, the PON standard may be the Gigabit Passive Optical Networks (GPON) standard developed by the International Telecommunication Union (ITU) or the Ethernet Passive Optical Networks (EPON) standard developed by the Institute of Electrical and Electronics Engineers (IEEE). Other flavours of PON such as APON, 10G-PON, 10G-EPON, SPON and the like may also be used.

Packets may be passed in the LAN 10 amongst the peripheral devices 28. In this manner, the OLT behaves as a layer 2 (L2) switch (i.e. data link layer) in the Open Systems Interconnection (OSI) model, while providing the benefits of an optical infrastructure including long reach, smaller and lighter cables, fewer cables, and resistance to lightning and electrostatic discharge (ESD).

In addition, using an OLT 12 with fiber optic transmission paths to implement the LAN 10 is desirable in that optical fiber is expected to become cheaper than unshielded twisted pair (UTP) cabling, as the cost of metals and other natural resources required by Ethernet cabling and the like increases.

As also shown in FIG. 1, the LAN 10 may include a powered patch panel 18 or unpowered patch panel 20 coupled to the passive optical splitter 16. The patch panels 18/20 may be coupled between the passive optical splitter 160 and one or more of the ONT 100. The patch panels 18/20 are configured to allow a plurality of ONT 100 to be plugged and unplugged into the LAN 100 over a plurality of second fiber optic connections 22.

In a preferred embodiment, the OLT 12, ONTs 100 may form a system for implementing a persistent identifier to allow a user to easily configure the ONTs 100. The DB 13 and CPU 15 may also be used. When the OLT 12 sends a registration event to the processor once an ONT 100 is registered with the OLT 12, the persistent identifier inputted by a user may be mapped to the particular registered ONT 100 (e.g. when ONT 100A is registered a persistent identifier may be mapped to ONT 100A). In this manner, the persistent identifier can be used by the system to identify the ONT 100 (ONT 100A), without referencing any information particular to the ONT 100 or the OLT 12. Typically, a user would need to know the ONT identifier and OLT identifier (if more than one OLT was used) or the dynamically assigned LLID in order to properly identify the ONT 100 that is being configured.

The persistent identifier may be mapped to the ONT 100. In this manner, the user can use the persistent identifier (e.g. "OEC-5" or "SW-basement") to identify the ONT 100 (e.g. with LLID "3", which is the 3$^{rd}$ ONT to be sequentially registered with the OLT 12). Using a persistent identifier, the user does not need to keep a separate mapping on a spreadsheet or piece of paper of which ONT 100 the user wishes to configure. Instead, the persistent identifier can be used continuously by the network administrator, without worrying that if the ONT 100 is re-registered, it will change LLID (or any other transient identifier).

In a preferred embodiment, the persistent identifier may be mapped to a port on the ONT 100 rather than the ONT 100 itself. The description can then reference the particular device connected to the port (e.g. CAM-SW-2FL or AP-Rotunda). In a preferred embodiment, the persistent identifier is a user-generated description. However, this does not need to be the case. In some embodiments, the persistent identifier is a numeral that is abstracted from the ONT identifier and the OLT identifier which may change upon power cycle, and which is different than a MAC address. Using a persistent identifier allows a user to easily referent the ONT 100 or port (if the persistent identifier references a port) so that the user can make changes to the system without having to search through dynamic tables or refer to a MAC address.

In operation according to another embodiment, a method can be used to assign a persistent identifier to an optical network terminal (ONT) by a processor. First, the ONT 100 is connected to the OLT 12 over a fibre optic connection 14/22. The ONT 100 then registers with the OLT 12. This may be accomplished over a passive optical networking standard. For example the standard may be EPON or GPON.

When the ONT 100 is registered with the OLT 12, the OLT 12 sends a registration event to the system, e.g. the processor 15. Processing the registration event at the processor 15 may include creating a table entry within database 13 linking the registration event to a persistent identifier inputted by a user. Accordingly, upon subsequent registrations of the ONT 100 by the processor, the processor is configured to link the persistent identifier with the registration event of the ONT 100. In this manner, the persistent identifier, inputted by the user, can be used to identify the ONT 100.

In a preferred embodiment, registering the ONT 100 with the OLT 12 includes obtaining a logical link identifier (LLID) for the ONT 100. The LLID may be indicative of a registration order of the ONT 100, according to the associated passive optical networking standard used. This LLID may subsequently change if the ONT 100 is power-cycled. In such instances, there is no guarantee that the subsequent registration of the ONT 100 with the OLT 12 would result in the same LLID. Accordingly, the persistent identifier allows the user to reference the same identifier without forcing the user to research how to identify the ONT 100. This is also useful when the system is restarted and all ONTs 100 must be re-registered with the system.

The persistent identifier may be mapped to a unique identifier of the ONT 100. In this manner, it may be used by the user or the system to determine if the ONT 100 has been previously registered during the subsequent registrations. In some embodiments, the unique identifier of the ONT 100 is a MAC address.

The persistent identifier may be mapped to a specific Ethernet port on the ONT 100 and does not need to be mapped to the ONT 100 itself. In some embodiments, a plurality of persistent identifiers may be used for a single ONT 100. Each port on the ONT 100 may receive its own persistent identifier. Furthermore, while the persistent identifiers may follow a pattern, the persistent identifiers do not need to follow any sort of pattern. For example, the persistent identifier may be a description of the ONT 100. Or the persistent identifier may be descriptions of the different ports on the ONT 100. Each of the plurality of persistent identifiers may be for a unique Ethernet port on the ONT 100.

In operation, upon the initial registration of the ONT by the processor, the database may be updated with configuration details of the ONT 100, as identified by the persistent identifier. Subsequently, the ONT 100 may be automatically configured with the configuration details stored in the database 13 particular to the ONT 100, as identified by the persistent identifier. In this manner, when an ONT 100 first comes online, it is cross referenced against a database 13 and if it is in the database 13, the ONT 100 is configured with the configuration details stored in the database 13. In a preferred embodiment, the configurations details may include model number, port speed, VLAN identifier, priority, and enabled status. It should be understood that other configuration details may be included, as would be known to persons skilled in the art.

In another preferred embodiment, the optical network terminal (ONT 100) may be configured at a computer terminal. The persistent identifier may be used. To start, the instruction or command may be read in. The instruction may include the user-inputted persistent identifier and an ONT command.

The ONT command may be used to configure the ONT 100. For example, the ONT command may include setting a port to a particular VLAN, enabling or disabling a port, setting a priority or changing a bandwidth configuration on the ONT 100. It should be understood that other ONT commands are possible.

Once entered, the system may use the persistent identifier to identify the ONT 100 within the database 13. This may include referencing the persistent identifier against a table in the database 13. For example, the system may use the reference to the persistent identifier against a table stored in the database 13.

A standard ONT identifier may be stored in the database 13. The standard ONT identifier may be determined by a passive optical networking standard. The table may include logical link identifiers (LLIDs) or MAC addresses for the different ONTs 100 registered within the system. Accordingly, while the user may only reference the persistent identifier, the system is configured to use the persistent identifier to identify a particular ONT 100 or port on the ONT 100, rather than transient or standard identifiers.

In a particular embodiment, the system may reference the persistent identifier against a table including standard ONT identifiers stored within the database. Once identified, the system may be configured to package an optical communication command to be sent through the OLT to the ONT 100. Once the instructions are packaged, the system may send the optical communication command to the ONT 100 through the OLT 12, which is optically coupled to the ONT 100.

The user-inputted persistent identifier is a description of the ONT 100. This may allow a user to abstract away from the standard ONT identifier. Similarly, the user-inputted persistent identifier may be a description of a port on the ONT 100, which also may be used to abstract away from the standard ONT identifier. In this manner, a user would not need to know about the particular standard being used to connect the different ONTs 100. Instead, user-generated descriptions may be included in the system to provide a better user experience. In this manner, the user would only need to remember the description and not any particular standard ONT identifier, in order to reference a particular ONT 100 or port on the ONT 100.

In yet another embodiment, an OLT 12 may be used to communicate with a system. This may include the system receiving a registration event from the OLT 12. The registration event may indicate the OLT 12 has successfully registered the ONT 100 with the OLT 12 via an optical coupling. The system may interpret the registration event to determine if the ONT 100 is already known to the system. If the ONT 100 is recognized, the system may be updated to acknowledge the registration of the ONT. Furthermore, if the ONT is recognized, the system may configure the ONT 100 with information stored in the system. For example, the system may store configuration details of the ONT 100 which may be automatically loaded back in to the ONT 100 when the ONT 100 re-registers with the OLT 12.

The system may be configured to accept a persistent identifier to abstract the ONT 100 from the system for future configuration by a user. In this manner, the user only needs to remember the persistent identifier, instead of any identifier (standard or transient) particular to the ONT 100. This may make it easier for the user to configure the ONT 100.

Figure 2:
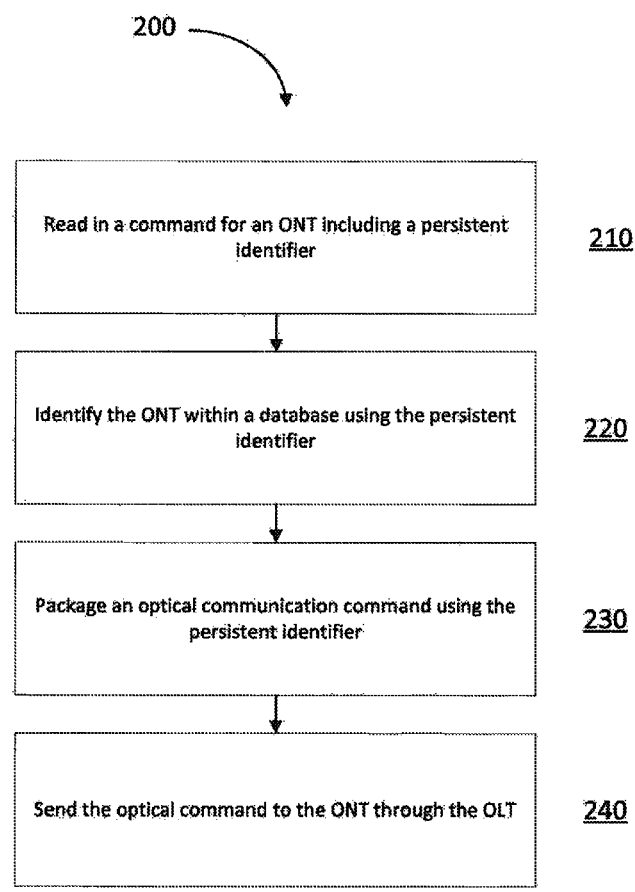
FIG. 2 shows an example of a flowchart for configuring an optical network terminal at or from a computer terminal in accordance with an embodiment of the present invention.

In operation, a preferred embodiment includes a method 200 for configuring an ONT 100 from or at a computer terminal (not shown) as depicted in FIG. 2. At BLOCK 210, the method 200 may include reading in an instruction including a persistent identifier and an ONT command. The instruction may be operable to configure the ONT 100. For example, the instruction may be a command for setting a VLAN or enabling or disabling a port on the ONT 100.

At BLOCK 220, the method 200 may then include identifying the ONT 100 within a database 13 using the persistent identifier. Identifying the ONT 100 may include referencing the persistent identifier against a table in the database. The table may include a list of standard transient ONT identifiers stored within the database. The persistent identifier may identify the standard transient ONT identifier for a particular ONT 100 using the persistent identifier provided.

At BLOCK 230, the method 200 may include packaging an optical communication command to be sent through an optical line terminal (OLT) using the ONT identified by the persistent identifier through the database. For example, the command may be part of a passive optical networking management protocol, as is known in the art. The management protocol may be from, for example, the China Telecom (CTC) management protocol, DOCSIS Provisioning of EPON (DPoE), Service Interoperability in Ethernet Passive Optical Networks (SIEPON), ONU Management and Control Interface (OMCI), and the like. The persistent identifier is used to identify or reference the information required by the management protocol.

Once properly packaged, at BLOCK 240, the optical communication command is sent to the ONT 100 via the OLT 12. The optical communication command is sent over a fiber optic connection between the OLT 12 and the ONT 100.

Figure 3:
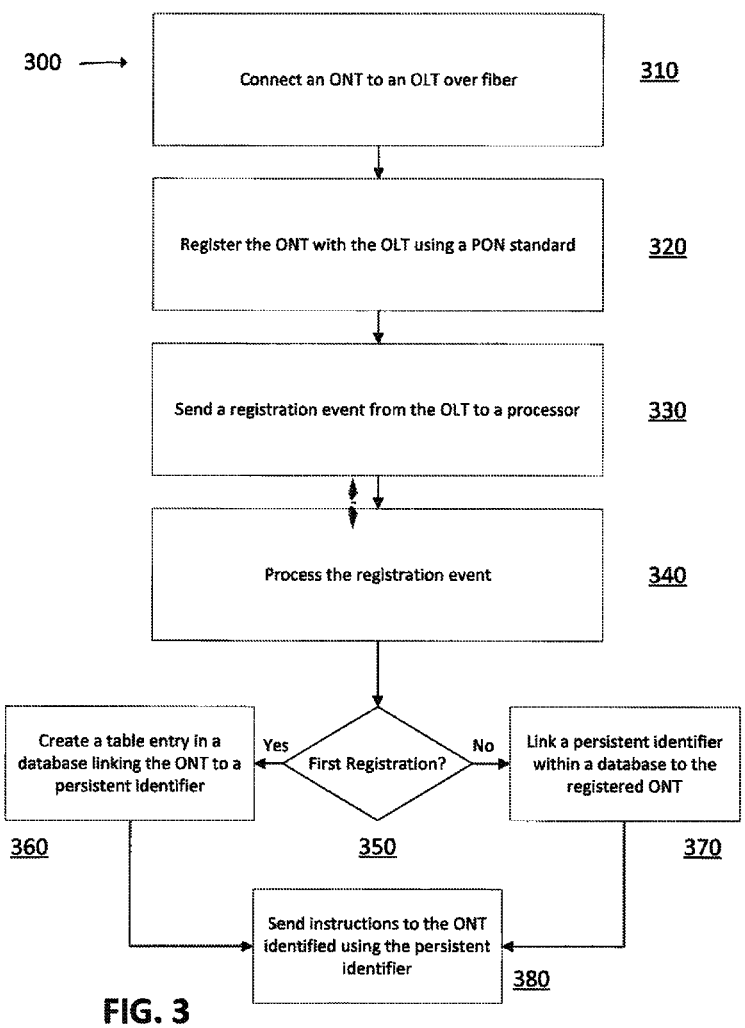
FIG. 3 shows an example of a flowchart for assigning a persistent identifier to an optical network terminal (ONT) by a processor in accordance with an embodiment of the present invention.

In another preferred embodiment, a method 300 for assigning a persistent identifier to an ONT 100 by a processor is shown in FIG. 3. Referring to BLOCK 310, the method 300 may include connecting the ONT 100 to an OLT 12 over a fibre optic connection 14/22. Many ONTs 100 may be connected to the same OLT 12 be connected using passive optical networking via a splitter 16. Varied topologies of splitters 16 and fiber optic connections 14/22 may be used, as would be understood by persons skilled in the art.

Next, at BLOCK 320, the ONT 100 may register with the OLT 12 using a passive optical networking standard. For example, the PON standard may be EPON, GPON, XEPON, and the like. The registration process may include, for example, creating a logical link identifier (LLID) for the ONT 100 and setting up a service level agreement between the OLT 12 and the ONT 100. Other registration events may include identifying timing and other dynamic bandwidth allocation (DBA) information.

As shown in BLOCK 330, once registered, the OLT 12 sends a registration event to the processor 15. This may be in the form of an interrupt or other signal that identifies to the CPU 15 that the OLT 12 has registered an ONT 100.

When received by the processor 15 at BLOCK 340, the CPU 15 may undertake a number of steps to set up and process the registration event. For example, the first step may be to identify whether the ONT 100 is being registered with the OLT 12 for the first time. For example, the processor may check the MAC Address or other identifier against a list of identifiers stored in the database 13 to see if the ONT 100 has previously registered with the ONT 100, as shown in BLOCK 350. Upon initial registration of the ONT by the processor 15, as shown in BLOCK 260, a table entry may be created within the database 13 linking the registration event to a persistent identifier.

The persistent identifier may be inputted by a user. Alternatively, the persistent identifier may be automatically generated by the processor but follow a pattern easily remembered by users. In a preferred embodiment, the persistent identifier is unique to the ONT 100, but each ONT 100 may have more than one persistent identifier and each persistent identifier may be used to reference the ONT 100 or reference certain components of the ONT 100, such as a specific port. The persistent identifier may also be changed by the user once entered into the database. For example, if the persistent identifier is first allocated by the processor 15, the user may be able to modify the persistent identifier to better suit the ONT 100. In a preferred embodiment, the user may be able to create a new persistent identifier for the ONT 100.

Upon subsequent registrations of the ONT 100 by the processor 15, as shown in BLOCK 370, the persistent identifier, previously inputted by the user, may be linked with the registration event of the ONT 100. At this stage, the ONT 100 may take on configurations that had been previously applied to the ONT 100 upon its earlier registration. Configurations may include, for example, VLAN, port enable/disable, speed and the like. This information may have been stored within the database 13.

Once registered, as shown in BLOCK 280, future optical commands may be sent to the ONT 100 using the persistent identifier. In this manner, the user does not need to remember difficult transient identifiers to send the commands. Instead, the processor 15 is operable to look-up the information required to package and send the command to the ONT 100 from information stored in the database 13 when passed the persistent identifier. This is made possible by linking the required information to the persistent identifier, which improves usability of the network management system.

In the foregoing specification, the disclosure has been described with reference to specific exemplary embodiments thereof. It will be evident that various modifications may be made thereto without departing from the broader scope of the disclosure as set forth in the following claims. The scope of the claims should not be limited by the preferred embodiments set forth in the examples, but should be given the broadest interpretation consistent with the description as a whole. The specification and drawings are, accordingly, to be regarded in an illustrative sense rather than a restrictive sense.

The invention claimed is:

1. A method of configuring an optical network terminal (ONT) at a computer terminal, the method comprising:
    reading in an instruction including a persistent identifier and an ONT command, the instruction operable to configure the ONT;
    identifying the ONT using the persistent identifier within a database having updated configuration details of the ONT, wherein identifying the ONT includes referencing the persistent identifier against a table including standard transient ONT identifiers stored within the database, wherein the standard transient ONT identifiers are capable of changing upon subsequent registrations of the ONT with an optical line terminal (OLT);
    packaging an optical communication command to be sent through the OLT using the ONT identified by the persistent identifier through the database, wherein upon the subsequent registrations of the ONT, the ONT is automatically configured by the processor through the OLT coupled to the ONT, with the configuration details stored in the database particular to the ONT, as identified by the persistent identifier; and
    sending the optical communication command to the ONT through the OLT, which is optically coupled to the ONT.

2. The method of claim 1, wherein the standard transient ONT identifiers include logical link identifiers (LLIDs) determined by a passive optical networking standard.

3. The method of claim 1, wherein the persistent identifier is user inputted.

4. The method of claim 3, wherein the user-inputted persistent identifier is a description of the ONT, which is abstracted from the standard transient ONT identifier.

5. The method of claim 3, wherein the user-inputted persistent identifier is a description of a port on the ONT, which is abstracted from the standard transient ONT identifier.

6. A system for sending a command by a user to an optical network terminal (ONT), the system comprising:
    an optical line terminal (OLT) operable to register with the ONT;
    one or more processors in communication with the OLT; and
    a database coupled to the one or more processors;
        wherein the OLT sends a registration event to the processor once the ONT is registered with the OLT and wherein the one or more processors, through the OLT, communicates with the ONT using a transient identifier, the transient identifier being capable of changing upon subsequent registration of the ONT with the OLT,
        wherein a persistent identifier stored in the database having updated configuration details of the ONT is used by the user to identify the ONT without referencing the transient identifier of the ONT, and in operation, the command from the user is automatically sent to the ONT by the OLT using the transient identifier identified by the persistent identifier, and wherein upon the subsequent registrations of the ONT, the ONT is automatically configured by the processor through the OLT coupled to the ONT, with the configuration details stored in the database particular to the ONT, as identified by the persistent identifier.

7. The system of claim 6, wherein the persistent identifier is mapped to the ONT.

8. The system of claim 6, wherein the persistent identifier is mapped to a port on the ONT.

9. The system of claim 6, wherein the persistent identifier is a user-generated description.

10. A method for assigning a persistent identifier to an optical network terminal (ONT) by a processor in communication with an optical line terminal, the method comprising:
    a. connecting the ONT to the optical line terminal (OLT) over a fibre optic connection;
    b. registering the ONT with the OLT using a passive optical networking standard using a transient identifier which is capable of changing upon subsequent registrations of the ONT with the OLT;
    c. sending a registration event from the OLT to the processor,
    d. processing the registration event at the processor, the processing comprising:
        upon initial registration of the ONT by the processor:
            creating a table entry within a database linking the registration event to a persistent identifier inputted by a user and updating the database with configuration details of the ONT, and
        upon subsequent registrations of the ONT by the processor:
            linking the persistent identifier, previously inputted by the user, with the subsequent registration events of the ONT, and automatically configure the ONT by the processor through the OLT coupled to the ONT, with the configuration details stored in the database particular to the ONT, as identified by the persistent identifier.

11. The method of claim 10, wherein registering the ONT with the OLT comprises obtaining a logical link identifier (LLID) for the ONT indicative of a registration order of the ONT.

12. The method of claim 10, wherein the persistent identifier is mapped to a unique identifier of the ONT to determine if the ONT has been previously registered during the subsequent registrations.

13. The method of claim 12, wherein the unique identifier of the ONT is a MAC address.

14. The method of claim 10, wherein the method includes a plurality of persistent identifiers for the ONT.

15. The method of claim 14, wherein each of the plurality of persistent identifiers is for a unique Ethernet port on the ONT.

* * * * *